United States Patent
Schreckenberger

(10) Patent No.: US 6,453,883 B2
(45) Date of Patent: Sep. 24, 2002

(54) FUEL SUPPLY MODULE FOR AN INTERNAL COMBUSTION ENGINE OF A MOTOR VEHICLE

(75) Inventor: Dieter Schreckenberger, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/735,370

(22) Filed: Dec. 12, 2000

(30) Foreign Application Priority Data

Dec. 22, 1999 (DE) ..................................... 299 22 473 U

(51) Int. Cl.$^7$ .............................................. F02M 37/04
(52) U.S. Cl. ...................................... 123/509; 123/514
(58) Field of Search ................................. 123/509, 514, 123/457, 511, 497; 417/360; 137/565.01, 565.13

(56) References Cited

U.S. PATENT DOCUMENTS

| 5,392,750 A | * | 2/1995 | Laue et al. .................. 123/509 |
| 5,769,061 A | * | 6/1998 | Nagata et al. ............... 123/509 |
| 5,782,223 A | * | 7/1998 | Yamashita et al. .......... 123/510 |
| 6,062,203 A | * | 5/2000 | Takahashi et al. .......... 123/509 |

FOREIGN PATENT DOCUMENTS

DE          195 31 467 A1       2/1997

* cited by examiner

Primary Examiner—Willis R. Wolfe
Assistant Examiner—Mahmoud Gimie
(74) Attorney, Agent, or Firm—Michael J. Striker

(57) ABSTRACT

The fuel supply unit has a pot-shaped reservoir (12) arranged in a fuel tank (10), in which a fuel feed device (18) is arranged. The fuel feed device (18) feeds fuel from the fuel tank (10) to the internal combustion engine. The fuel supplied by the fuel feed unit (18) feeds fuel through a fuel filter (24). The hydraulic connection of the filter (24) with the fuel feed device (18) is made by means of a distributor plate (36). A tubular projecting portion (32) is formed on an outer wall section (14) of the reservoir (12) in one piece with the outer wall section. The tubular projecting portion (32) is open on its top side and at least partially forms a housing for the filter (24) and a filter element (34) is inserted in it. The distributor plate (36) forms a covering element for the housing (32) since it is tightly connected with the top side of the housing (32). The fuel fed from the fuel feed device (18) flows through a passage (48) in the distributor plate (36) into the fuel filter (24) and then out from the fuel filter (24) through the distributor plate (36) again. No separate housing is required for the fuel filter (24).

9 Claims, 2 Drawing Sheets

FUEL SUPPLY MODULE FOR AN INTERNAL COMBUSTION ENGINE OF A MOTOR VEHICLE

BACKGROUND OF THE INVENTION

1. Field of the Invention

The present invention relates to a fuel supply module for an internal combustion engine of a motor vehicle and, more particularly, to a fuel supply module comprising a fuel feed device by which fuel from a fuel tank is fed to the internal combustion engine and a fuel filter.

2. Prior Art

This type of fuel supply module is described in German Patent Document DE 195 31 467 A1. This fuel supply module has a fuel feed device arranged in a fuel tank for an internal combustion engine, by which fuel is supplied to an internal combustion engine of the motor vehicle from a fuel tank. Furthermore a fuel filter is also provided in the fuel supply module. Fuel fed by the fuel feed device flows through the fuel filter, which has a filter housing. Furthermore a connecting member is provided, which provides a hydraulic connection of the filter with the fuel supply device. The fuel filter has a high manufacturing and assembly expense because of the separate filter housing and the required attachment of the filter housing.

SUMMARY OF THE INVENTION

It is an object of the present invention to provide an improved fuel supply module of the above-described kind, in which no separate filter housing is required so that manufacturing and assembly expenses are reduced.

According to the invention fuel supply module comprises a fuel tank; a fuel feed device arranged in the fuel tank for feeding fuel from the fuel tank to the internal combustion engine; a fuel filter through which the fuel supplied by the fuel feed device flows, which includes a filter housing; a connecting member for providing a hydraulic connection between the fuel filter and the fuel feed device; a pot-shaped reservoir arranged in the fuel tank, in which the fuel feed device is arranged and from which the fuel is fed by the fuel feed device. The connecting member is at least approximately plate-shaped and arranged above the fuel feed device. The filter housing is at least partially formed by the reservoir or the connecting member or by both of the reservoir and the connecting member.

The fuel supply module according to the invention has the advantage that no separate filter housing is required for the fuel filter since it is provided by the fuel reservoir and/or in the connecting member.

Various preferred embodiments of the fuel supply unit according to the invention are described in detail hereinbelow.

In one preferred embodiment a tubular projecting portion extends from the connecting member into the reservoir and is formed in one piece with the connecting member and the tubular projecting portion is closed by a covering element and forms a part of the filter housing.

In another preferred embodiment a tubular projecting portion extends from an outer wall section of the reservoir into the reservoir and is formed in one piece with the outer wall section and the tubular projecting portion is closed by a covering element and forms a part of the filter housing.

The tubular projecting portion is open on its top side in some embodiments and the connecting member then acts as a covering element for closure of the tubular projecting portion. In other embodiments the tubular projecting portion is open on its bottom side and the reservoir has a base acting as a covering element for closure of the tubular projecting portion.

The covering element can be glued or bonded with the tubular projecting portion in various embodiments.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
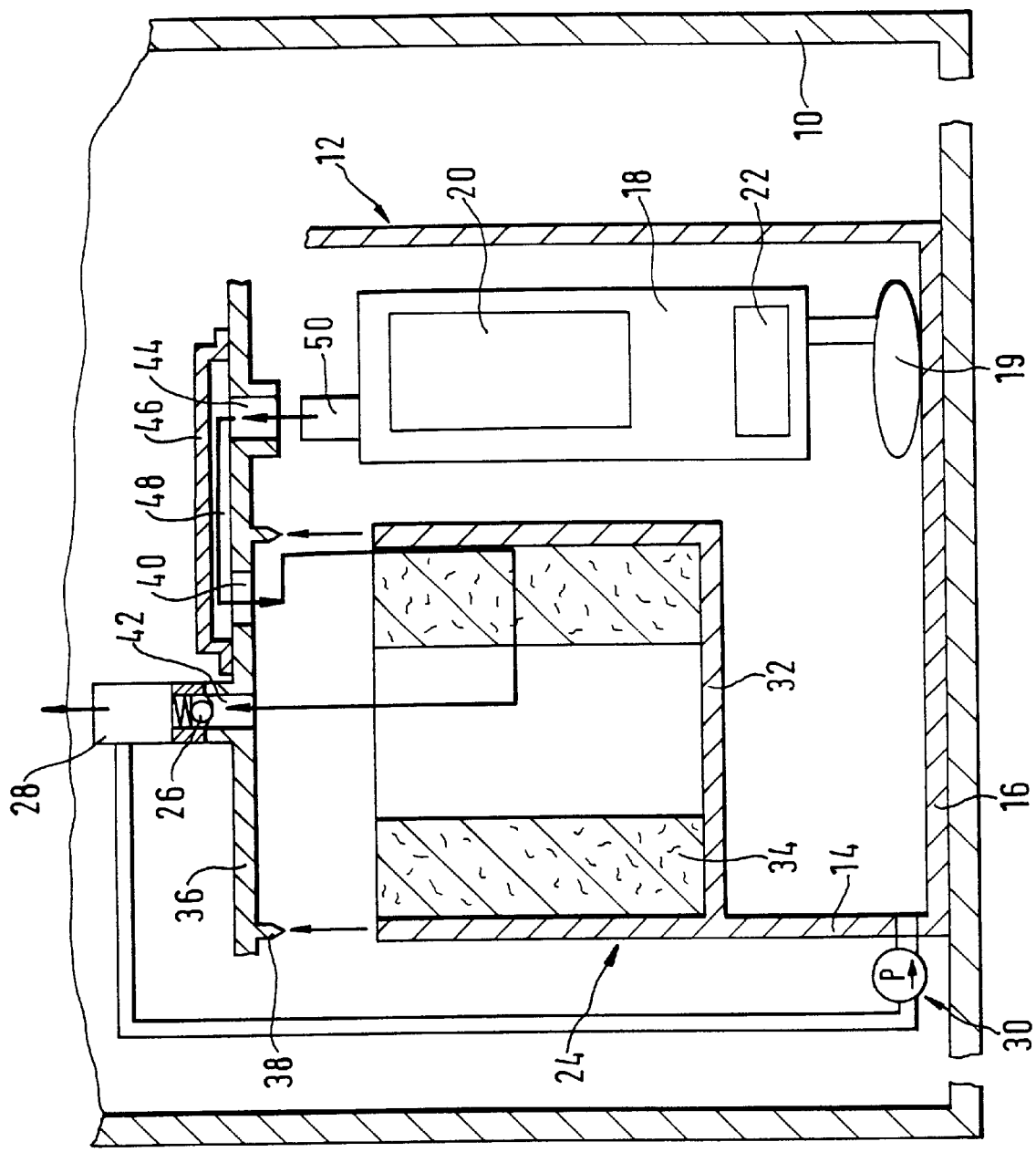
FIG. 1 is a schematic cross-sectional view of a fuel supply module according to a first embodiment of the invention.
Figure 2:
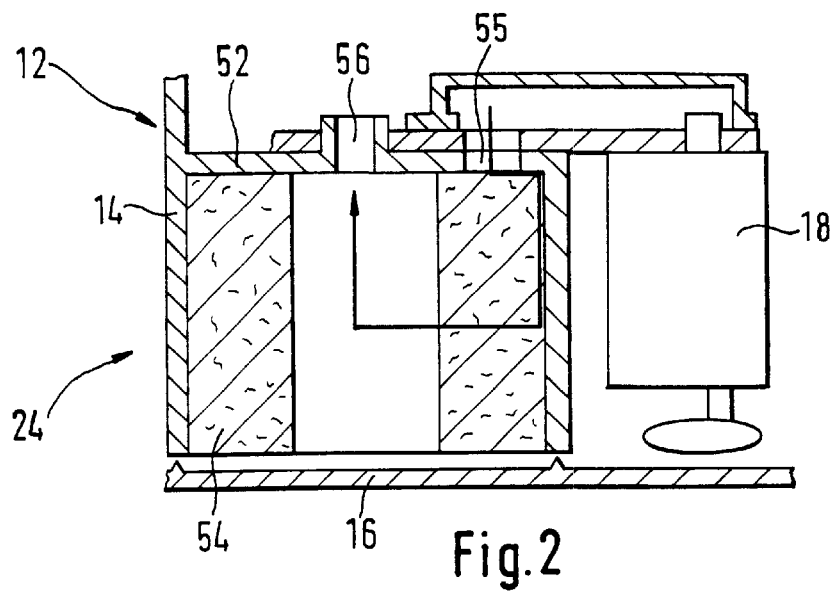
FIG. 2 is a schematic cross-sectional view of a fuel supply module according to a second embodiment of the invention.
Figure 3:
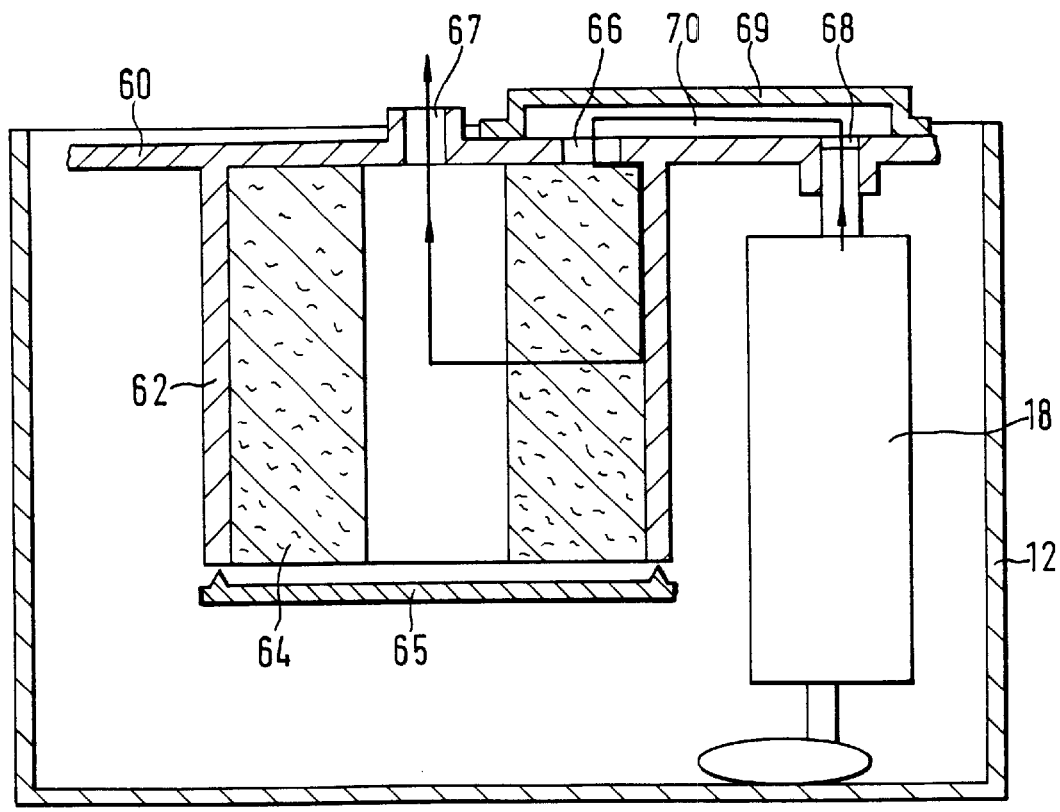
FIG. 3 is a schematic cross-sectional view of a fuel supply module according to a third embodiment of the invention.

A fuel supply module for a motor vehicle shown in FIGS. 1 to 3 have a reservoir 12 arranged in a fuel tank 10 of the motor vehicle. The volume of the reservoir 12 is substantially less than the volume of the fuel tank 10. The reservoir 12 is pot-shaped and made, preferably, of a fuel-resistant plastic material. The reservoir 12 has an approximately cylindrical hollow outer wall section 14 and a base 16. The cylindrical outer wall section 14 and the base 16 can be in one piece with each other, or they can be separate parts, which are connected with each other, for example by bonding, especially ultrasonic bonding, or adhesive means. A fuel feed device 18 is arranged in the reservoir 12, through which fuel is fed to an injection unit of an internal combustion engine of the motor vehicle from the reservoir 12. The fuel feed unit 18 has a drive portion 20, especially in the form of an electric motor, and a pump portion 22, which are arranged in a common housing. The fuel feed device 18 is held in a manner not shown in further detail in the reservoir 12.

The fuel fed from the fuel feed device 18 flows through a main fuel filter 24, which is part of the fuel supply module. The fuel feed device 18 can draw fuel from the reservoir 12 through a pre-filter 19. The main fuel filter 24 has a filter element with smaller pores than those of the filter element of the pre-filter 19. The fuel fed by the fuel feed device 18 from the main fuel filter 24 arrives in the fuel injection unit of the internal combustion engine. A non-return valve 26 and/or a pressure regulator 28 can be arranged between the fuel injection unit and the main fuel filter 24. The non-return valve 26 guarantees that fuel can only travel from the fuel feed device 18 to the internal combustion engine, but not from the internal combustion engine back to the fuel feed device 18. If necessary, a separate return line can be provided from the internal combustion engine to the fuel tank 10. The pressure at the fuel injection unit is adjusted by the pressure regulator 28 to a predetermined level, since a portion of the fuel fed by the fuel feed device 18 is returned through a return line of the pressure regulator under control of the pressure regulator. The return line of the pressure regulator opens into the tank 10 or the reservoir 12. A jet pump 30 can be connected in the return line from the pressure regulator 28 or in a return line from the internal combustion engine to the fuel tank 10, by which fuel is fed from the fuel tank 10 into the reservoir 12.

The fuel supply module according to a first embodiment is shown in FIG. 1. A pot-shaped projecting portion 32 in the reservoir 12, especially from its outer wall section 14, extends into the reservoir 12 and is formed in one piece with it. The pot-shaped projecting portion 32 forms at least part of a housing for the fuel filter 24. The pot-shaped housing 32 is open on its upper or top side and a filter element 34 is inserted in it. A plate-shaped connecting member 36 is arranged above the housing 32 and above the fuel feed device 18. A hydraulic connection of the fuel feed device 18 with the fuel filter 24 is formed in the plate-shaped connecting member 26. In the following description the connecting member 36 is called a distributor plate. The underside of the distributor plate 36 in the vicinity of the fuel filter 24 is formed so that the distributor plate 36 can be connected tightly with the housing 32 of the fuel filter 24 and thus act as a covering or closure element. The connection of the distributor plate 36 with the housing 32 can, for example, occur by means of adhesive material. The distributor plate 36 comprises, preferably, a plastic material like that of the reservoir 23. Thus the distributor plate 36 can be bonded with the housing 32. The bonding preferably occurs by ultrasonic bonding methods. A peripheral lip 38 protrudes from the underside of the distributor plate, which extends circumferentially around the housing 32 according to the cross-section of the housing 32 which is bonded with the facing end edges of the housing 32 by ultrasonic bonding techniques. Thus a closed chamber is formed by the housing 32 and the distributor plate 36, in which the filter element 34 is arranged.

The distributor plate 36 is provided with an opening 40, through which the fuel fed by the fuel feed device 18 enters into the dirty-side of the fuel filter and another opening 42, through which the fuel leaves the fuel filter 24 by way of the clean-side filter outlet. The distributor plate 36 also has an additional opening 44 besides the opening 40. A cap 46 is tightly bonded with the distributor plate 36 and forms a passage 48 connecting the openings 40 and 44. Fuel entering the passage through the opening 44 from the fuel feed device 18 flows through the passage 48 and enters the fuel filter through the opening 40. The cap 46 comprises preferably plastic material and is bonded or glued with the distributor material. The fuel feed device 18 can have a high pressure connector 50, which extends through the opening 44. The fuel passing through the opening 42 from the filter 24 arrives at the internal combustion engine through the non-return valve 26 and the pressure regulator 28. The non-return valve 26 and the pressure regulator 28 can be arranged in the distributor plate 26. By connection of the distributor plate 36 with the housing 32 it is also held in the reservoir 12. The distributor plate 36 can form a cover for the reservoir 12, by which an overflow of fuel from the reservoir 12 into the fuel tank 10 is prevented or at least hindered.

Another embodiment of the fuel supply module according to the invention is shown in FIG. 2. A pot-shaped projecting portion 52 extends from an outer wall section 14 of the reservoir 12 into the reservoir 12 and is in one piece with the outer wall section 14. This pot-shaped projecting portion 52 at least partially forms a housing for a fuel filter 24. The housing 52 is open on its bottom side and a filter element 54 is inserted in it. The base 16 of the reservoir 12 has a peripheral lip 58 on its upper side protruding from it, which extends circumferentially around the housing 52 according to the cross-section of the housing 52. The housing 52 is tightly connected at its facing end edge with the peripheral lip 58 of the base 16, especially by bonding or gluing. The base 16 of the reservoir 12 acts as a covering element, by means of which the housing 52 is closed. An inlet opening 55 for the dirty-side admission of fuel from the fuel filter 24 and an outlet opening 56 for the clean-side outflow of fuel from the fuel filter 24 to the non-return valve 26 and the pressure regulator 28 (the latter two features not being shown in FIG. 2) are formed in the upper side of the housing 52.

The fuel supply module according to a third embodiment of the invention is shown in FIG. 3. In this embodiment a distributor plate 60 is provided, by which a hydraulic connection is formed between the fuel filter 24 and the fuel feed device 18. A tubular-shaped projecting portion 62 extends into the reservoir 12 from the lower side of the distributor plate 60. This tubular-shaped projecting portion 62 at least partially forms a housing for the fuel filter 24 and has a filter element 64 arranged in it. The open underside of the projecting portion 62 is closed by means of a covering element 65, which is preferably plastic and is bonded or glued with the projecting portion for example. An inlet opening 66 is provided in the distributor plate 60 for the dirty-side admission of fuel to the fuel filter 24 from the fuel feed device 18. An outlet opening 67 for a clean-side outflow of fuel from the fuel filter 24 is provided in the distributor plate 60. Also as in the first embodiment shown in FIG. 1 an outlet opening 68 is formed in the distributor plate 60 for outflow of fuel from the fuel feed device 18. A cap 69 is tightly connected to the upper side of the distributor plate 60 so as to form a passage 70 between the outlet opening 68 and the inlet opening 66. The covering element can be arranged also on the reservoir 12.

The disclosure in German Patent Application 299 22 473.2 of Dec. 22, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a fuel supply unit for an internal combustion engine of a motor vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. A fuel supply module for an internal combustion engine of a motor vehicle, said fuel supply module comprising
    a fuel tank (10);
    a fuel feed device (18) arranged in the fuel tank (10) and comprising means for feeding fuel from the fuel tank (10) to the internal combustion engine;
    a fuel filter (24) through which the fuel supplied by the fuel feed device (18) flows, said fuel filter (24) including a filter housing (32;52;62);
    a connecting member (36;60) for providing a hydraulic connection between the fuel filter (24) and the fuel feed device (18);
    a pot-shaped reservoir (12) arranged in the fuel tank (10), in which said fuel feed device (18) is arranged and from which said fuel is sucked by the fuel feed device (18);
    wherein said connecting member (36;60) is at least approximately plate shaped and arranged above the fuel feed device (18) and wherein said filter is housing (32;52;62) is at least partially formed by said reservoir (12) or said connecting member (36;60) or by both of said reservoir and said connecting member.

2. The fuel supply module as defined in claim 1, further comprising a tubular projecting portion (62) extending from said connecting member (60) into the reservoir (12) and formed in one piece with the connecting member (60) and wherein said tubular projecting portion (62) is closed by a covering element (65) and forms a part of said filter housing.

3. The fuel supply module as defined in claim 1, further comprising a tubular projecting portion (32;52) extending from an outer wall section (14) of said reservoir (12) into the reservoir (12) and formed in one piece with the outer wall section (14) and wherein said tubular projecting portion (32;52) is closed by a covering element (36; 16) and forms a part of said filter housing.

4. The fuel supply unit as defined in claim 3, wherein the tubular projecting portion (32) has a top side and is open on said top side and said connecting member (36) acts as said covering element for closure of the tubular projecting portion (32).

5. The fuel supply unit as defined in claim 3, wherein the tubular projecting portion (52) has a bottom side and is open on said bottom side and said reservoir (12) has a base (16) acting as said covering element for closure of the tubular projecting portion (52).

6. The fuel supply unit as defined in claim 2, 4 or 5, wherein said covering element (36; 16; 65) is glued or bonded with said tubular projecting portion (32; 52; 62).

7. The fuel supply module as defined in claim 1, wherein said pot-shaped reservoir (12) has a volume substantially less than that of said fuel tank (10).

8. The fuel supply module as defined in claim 7, wherein said pot-shaped reservoir (12) comprises a base (16) and a cylindrical outer wall section (14).

9. The fuel supply module as defined in claim 7, wherein said fuel feed device (18) is inside of said pot-shaped reservoir (12), but outside of said filter housing.

* * * * *